March 24, 1953  E. H. SMITH  2,632,680

PISTON CUP

Filed Dec. 10, 1949

INVENTOR.
EDMUND H. SMITH
BY
Fraser, Myers & Manley
Attorneys

Patented Mar. 24, 1953

2,632,680

UNITED STATES PATENT OFFICE 2,632,680

PISTON CUP

Edmund H. Smith, Palmyra, N. Y., assignor to The Garlock Packing Company, Palmyra, N. Y., a corporation of New York Application December 10, 1949, Serial No. 132,373

2 Claims. (Cl. 309—33)

This invention relates to improvements in piston cups, and more particularly to piston cups which are formed of suitable molded material with means incorporated therein for reinforcing the cup.

In providing reinforcing means in such piston cups heretofore produced, the cup has commonly been formed from a flat blank of sheet fabric material impregnated with suitable relatively soft, flexible plastic material. Such a blank commonly has included plural plies of the fabric so arranged that its threads run only in two right-angular directions. When molded in suitably shaped dies, such a blank is converted from its flat shape to the desired cup shape with a cylindrical sealing flange for effecting a seal between a piston and a wall of a cylinder in which the piston operates.

Such piston cups, in actual service, have been unsatisfactory, either because they break down in service or permit serious leakage past the piston after a relatively short period of service. Hence, frequent replacements of such piston cups have been necessary with resultant expense not only in the cost of the replacement cups, but also arising from the fact that the machine in which the cup is employed is necessarily out of service frequently while new cups are being installed.

The principal reason for the mentioned shortcomings of such prior piston cups, apparently resides in the fact that, when formed from such blanks, the sealing flange of the cup has alternate relatively rigid portions and flexible portions about its circumference corresponding to alternate portions in which the threads of the fabric extend both parallel and right angularly to the free edge of the sealing flange at four uniformly spaced circumferential points and other, intermediate portions wherein the fabric threads extend at oblique angles to the free edge of the sealing flange. In service, such cups wear excessively at the flexible portions, probably because of the inability of the cup to maintain uniform engagement with the cylinder around the entire circumference of the cup.

In such prior cups, also, it sometimes happens that the threads which extend perpendicular to the free edge of the sealing flange become severely strained during molding and break then or soon after the cup is placed in service, thus materially weakening the cup and greatly shortening its life. Also, this weakening of the fabric tends to break down the weave of the fabric, leading to loose threads or "hang nails"; an objectionable condition which can lead to serious leakage past the piston.

An important object of the present invention is the provision of a piston sealing cup in which fabric is employed for reinforcing purposes in such an arrangement that the sealing flange of the cup is uniformly and adequately reinforced around its entire circumference.

Another object of this invention is the provision of a piston sealing cup with relatively rigid base portions which, together with such a uniformly reinforced sealing flange, give adequate support to said flange against the force of pressure fluid exerted axially upon the sealing flange.

The foregoing and other objects are accomplished according to the present invention, in its broader aspects, by forming the cylindrical sealing flange of a piston cup, principally from a cylindrical blank rather than from a flat blank. Such a cylindrical blank preferably includes plural layers of fabric wound in cylindrical form with the warp and weft threads of the fabric extending on the bias relatively to the axis of the blank, the multi-ply fabric being impregnated by and embedded within the moldable material of which the sealing flange is to be formed. Such a cylindrical blank of suitable axial length is molded in suitably shaped dies, in association with mounting portions of a piston cup which, for example, may be in the form of a rigid shallow cup with a flat filler molded therewithin.

Although the present invention may be embodied in a variety of forms of piston cups which may be formed in various ways, nevertheless, for illustrative purposes, a preferred form of piston cup is illustrated in the accompanying drawing, together with preferred means for making such a cup. In the said drawing.

Figure 1:
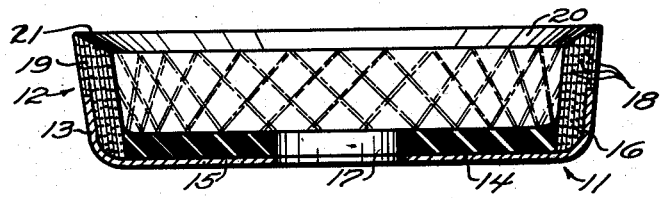
Figure 1 is a central axial section of a preferred form of piston cup according to this invention.

Referring to the drawings with more particularity, a piston sealing cup according to this invention may be as shown in Fig. 1 and may include a relatively rigid mounting cup 11, a resilient, approximately cylindrical sealing element 12, suitably bonded at one end marginal portion thereof to the inner face of a peripheral flange 13 of said mounting cup, and a disc-like filler piece 14 suitably bonded to the inner face of the bottom 15 of said mounting cup.

The mounting cup 11 is preferably formed of sheet metal, although it may be of some other suitably strong and relatively rigid material. Its flange 13 preferably encircles and supports an inner end portion 16 of the sealing element. Although said flange may exert some sealing effect with respect to a related cylinder wall, its primary purposes are to support the flexible sealing element and to maintain or aid in maintaining substantial concentricity of the piston relatively to a cylinder within which it operates.

The filler piece 14 serves to back up the inner end portion 16 of the sealing element to restrain the material in said portion from flowing radially inwardly in the mounting cup in response to fluid pressure exerted axially upon the free end of the sealing element during operation. The filler piece also may function as a gasket to effect a fluid-tight seal around an opening 17 formed in said filler piece and in the bottom 15 of the mounting cup to receive a mounting rod or bolt and nut assembly (not shown) by which the piston cup may be mounted upon a piston body when placed in service. The filler piece may be of any suitable material such as hard or soft rubber, or metal or reinforced impregnated fabric or any other material having characteristics adapting it to perform one or both of its mentioned functions.

The sealing element 12 is preferably formed of reinforced, molded material, such as "neoprene" or other molded material suitable for withstanding pressure strains to which it may be subjected in use and for resisting deleterious effects of the fluid with which the piston is to function. Prior to installation of the piston cup within a cylinder, in which it is to operate, the flexible sealing element 12, preferably, flares outwardly toward its free edge, but is deformed somewhat to a more nearly cylindrical shape when installed within the said cylinder. The sealing element 12, according to the present invention, includes a plurality of embedded, circumferentially-extending plies 18 of fabric in all of which the warp and weft threads, at all circumferential points, extend angularly with respect to lines which are coincident with the said sealing element and parallel to the axis of the piston cup; and for convenience such disposition of such threads is sometimes herein referred to by language including the word "bias." It is preferred that the warp threads and the weft threads be arranged in similar, but opposed angularity with respect to the mentioned parallel lines; however, the use of the word "bias," while inclusive of such similarity of angularity, is not to be taken as limited to a structure in which such similarity of angularity is necessarily present. The mentioned bias arrangement is indicated in broken lines in Figs. 1 and 3, only a limited number of threads being thus indicated.

The sealing element 12 is formed with a free or outer end portion 19 extending axially beyond the flange 13 of the mounting cup. This outer end portion, in accordance with more or less conventional practice, may have an annular end surface 20 which is tapered to a relatively sharp circumferential edge 21 at the outer periphery of the piston cup.

Piston cups as illustrated and described herein may be manufactured economically by a novel method which may be understood from the following description which, in turn, may aid in affording a complete understanding of the structure of the piston cup itself.

According to a preferred manner of making such piston cups, suitable woven fabric, preferably in a relatively large sheet, is impregnated with moldable material which when formed and cured will be suitable for resisting pressure and also for resisting the deleterious action of the fluid or fluids with which the piston is to function. Neoprene or other resilient rubber-like substances have been found to be suitable for use as such moldable material. The impregnated fabric sheet is wound on the bias upon a mandrel 25, of circular cross-section, in plural plies until the wound fabric forms a cylinder 27 of about the thickness and cross-sectional size of a desired blank, from which a molded sealing element 12 may be formed.

The mentioned impregnation of the fabric can be deferred until after it has been wound in cylindrical form, or if the fabric has been impregnated in sheet form as hereinbefore described, it may be supplementally impregnated, if desired, after being formed into a cylinder.

Figure 2:
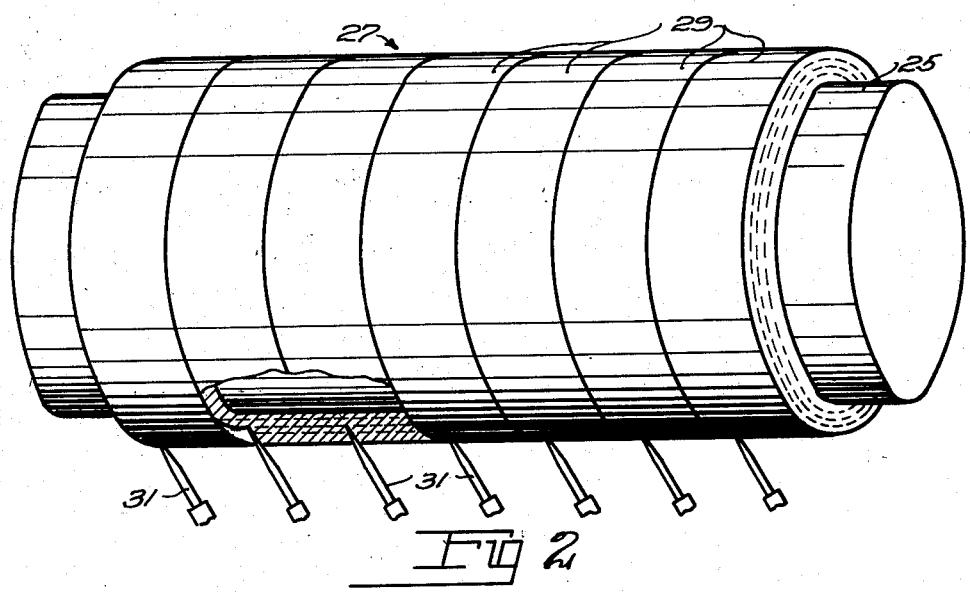
Fig. 2 is a perspective view, partly broken away and diagrammatic in certain respects, showing the manner in which a plurality of cylindrical sealing flange blanks may be cut from a cylinder of multi-ply fabric material to form individual blanks, each useful for forming a cylindrical flange of a piston cup.

After winding of the impregnated fabric to the extent indicated, any remaining unwound fabric is severed and laid aside. Then the fabric cylinder 27 is cut transversely into plural annular blanks 29. This may be accomplished conveniently by supporting plural knives 31 as diagrammatically illustrated in Fig. 2, at various spaced positions along said fabric cylinder and at similar angles such as will enable the knives to cut transversely through the fabric cylinder and to taper the ends of each blank to conform it somewhat to the ultimate desired cross-sectional configuration of a sealing element 12.

Figure 3:
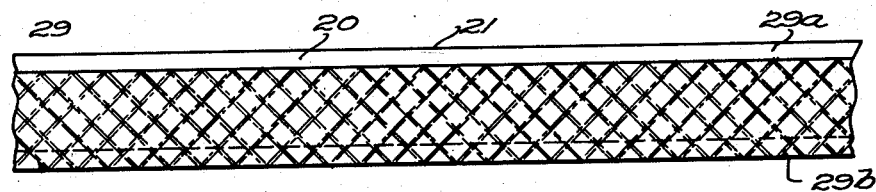
Fig. 3 is a side elevational view of one of the sealing flange blanks as it would appear if cut open axially at one circumferential point and then flattened out.
Figure 4:
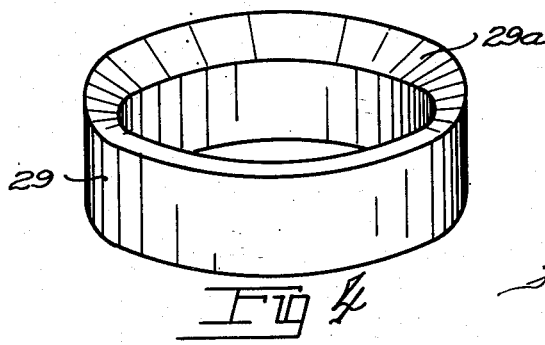
Fig. 4 is a perspective view of an individual cylindrical blank of multi-ply material suitable for use in forming a piston cup according to this invention.

The mandrel 25 with the fabric cylinder 27 thereon is rotated about its axis while the knives 31 are moved inwardly in unison toward the mandrel in a general direction which is parallel to the longitudinal axis of the knives. When these cuts have been completed, the knives are withdrawn, leaving plural blanks in the form of impregnated fabric rings 29 which are then removed from the mandrel. The ring blanks 29, as thus produced, have tapered opposite end surfaces 29a, 29b and the warp and weft threads of the fabric in said blanks are on the bias. One of the rings 29 is illustrated in Fig. 3 as though it were cut longitudinally at one circumferential point and then rolled out as a flat strip. This illustration is included in the drawing only to indicate clearly, in broken lines, the fact that the warp and weft threads of all plies of the fabric 18 are on the bias. The bias arrangement of the threads of the fabric is also indicated in broken lines in Fig. 1.

After formation of a ring blank 29, it is associated with a mounting cup 11 and a flat blank which, in the finished piston cup, will be the filler piece 14; these mentioned parts being associated within suitably shaped molds in their approximate positions as indicated in Fig. 1. In associating these parts in the mold, various adjacent portions thereof preferably are suitably treated, either by application thereto of adhesive material or otherwise to enhance the ultimate bond of those parts to each other.

After the mentioned parts are assembled in the molds, or in one of two cooperating molds, the molds are brought together to closed positions and subjected to heat and pressure in a well understood manner to press the several parts to their final desired shapes as they appear in Fig. 1 and to cure all such parts which are of curable material. Thereafter, the finished piston cup is removed from the molds.

It should be apparent that the hereinbefore-described method of manufacturing piston cups is well suited for producing piston cups of the general character shown in the drawings. It should be apparent also that piston cups as illustrated and described herein constitute a substantial improvement over prior piston cups because of the fact that the fabric of which the sealing element 12 is constructed is arranged so that the warp and weft threads are on the bias at each and every circumferential point about the piston cup.

Because of the mentioned bias arrangement, the sealing element engages an adjacent cylinder wall uniformly at all points therearound, thereby yielding an improved uniform sealing effect, and consequently minimizing leakage of fluid past the piston.

It should also be apparent that in piston cups of the character described herein the bias arranged threads are under no strain whatever during the molding operation as is the case where fabric reinforced piston cups are formed from flat blanks. Because of this absence of strain, the threads in the fabric remain fully intact in their original interwoven condition and, therefore, cannot become loose or become separated either in whole or in part from the sealing element. In prior structures, threads often became thus separated and caused considerable trouble in operation. Such trouble is completely obviated in devices according to this invention.

It should be obvious also that while the use of plural knives is desirable it is not essential and the process disclosed herein may be practiced with the use of only a single knife. Also while the described angular positioning of a knife with respect to the mandrel is desirable, nevertheless, if desired a knife may be disposed perpendicularly to the mandrel or at a greater or lesser angle with respect thereto. When the ring 29 is cut with its opposite ends tapered as hereinbefore described, the blank will, of course, conform more accurately to the ultimate shape of the sealing element 12, but if the end surfaces 29a and 29b are not tapered the proper tapering of the end surface 20 of the sealing element can be accomplished by the use of dies which are shaped to yield such a taper.

Although the sealing element 12 and the blank 29 from which it is formed have been hereinbefore described as having layers of fabric extending substantially throughout the entire thickness, nevertheless, it should be understood that plural plies of fabric could be provided which would occupy less than the entire thickness of the sealing element. For example, the plies could be disposed only in the center of the section of said sealing element with moldable material of an appreciable thickness constituting both the outer face and the inner face of said element, or the plies could be concentrated at the inner or outer face of the element, or for some purposes they could be concentrated at its inner and outer faces with an appreciable thickness of molded material in the center of the section of the sealing element. In all these possible arrangements it should be obvious that the described bias disposition of the threads will yield a highly beneficial result.

Although an attempt has been made to particularly point out several possible variations of this invention, it is not intended, by so doing, to limit the possible variations to those described; for the present invention obviously may be practiced in various other ways and in various other structures without, however, departing from the inventive concept as set forth in the following claims.

What I claim is:

1. A piston cup comprising a rigid mounting cup, having an approximately cylindrical peripheral flange, a flexible sealing element consisting solely of an approximately cylindrical flexible sealing sleeve including plural circumferentially extending layers of fabric molded therewith with the threads of the fabric on the bias at all circumferential points around said element, one end of said sleeve being confined within said peripheral flange, and means within the cup for restraining the said one end of said sleeve against radially inward deformation.

2. A piston cup according to claim 1, further characterized in that the said restraining means comprise a circular filler piece, overlying the inner face of the bottom of said cup with the outer peripheral surface of said filler piece in engagement with a cylindrical surface of an inner marginal portion of said one end of the flexible sealing sleeve to restrain the latter against radially inward displacement.

EDMUND H. SMITH.

REFERENCES CITED

The following references are of record in the file of this patent:

UNITED STATES PATENTS

| Number | Name | Date |
|---|---|---|
| 612,687 | Bosch | Oct. 18, 1898 |
| 1,320,675 | Christenson | Nov. 4, 1919 |
| 1,845,939 | Snowden | Feb. 16, 1932 |
| 1,945,524 | Foehr | Feb. 6, 1934 |
| 2,264,741 | Chamberlain | Dec. 2, 1941 |
| 2,318,757 | Christenson | May 11, 1943 |
| 2,388,520 | Bowie | Nov. 6, 1945 |
| 2,400,533 | Buffington | May 21, 1946 |
| 2,448,114 | Olson | Aug. 31, 1948 |
| 2,454,074 | Marc | Nov. 16, 1948 |